(12) United States Patent
Yamada et al.

(10) Patent No.: US 8,211,525 B2
(45) Date of Patent: Jul. 3, 2012

(54) HONEYCOMB STRUCTURE

(75) Inventors: Toshio Yamada, Nagoya (JP); Koji Nagata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 173 days.

(21) Appl. No.: 12/711,596

(22) Filed: Feb. 24, 2010

(65) Prior Publication Data

US 2010/0239811 A1    Sep. 23, 2010

(30) Foreign Application Priority Data

Mar. 19, 2009  (JP) .................... 2009-068402

(51) Int. Cl.
*B32B 3/12* (2006.01)
*B01D 50/00* (2006.01)
*B01D 53/34* (2006.01)

(52) U.S. Cl. ........ 428/116; 428/117; 422/177; 422/180; 422/181; 422/182; 422/183

(58) Field of Classification Search .................. None
See application file for complete search history.

(56) References Cited

U.S. PATENT DOCUMENTS

| | | |
|---|---|---|
| 2005/0166729 A1 | 8/2005 | Nishio et al. |
| 2006/0019061 A1* | 1/2006 | Oshimi ................ 428/116 |
| 2006/0191245 A1 | 8/2006 | Bardon |
| 2008/0236394 A1* | 10/2008 | Ohno et al. ................ 96/9 |

FOREIGN PATENT DOCUMENTS

| | | |
|---|---|---|
| EP | 1 591 431 A1 | 11/2005 |
| EP | 1 977 808 A1 | 10/2008 |
| EP | 2 236 481 A2 | 10/2010 |
| FR | 2 857 695 A1 | 1/2005 |
| JP | 2003-291054 | 10/2003 |

OTHER PUBLICATIONS

U.S. Appl. No. 12/711,617, filed Feb. 24, 2010, Nagata et al.
Extended European Search Report mailed Sep. 2, 2011.

* cited by examiner

*Primary Examiner* — Gordon R Baldwin
(74) *Attorney, Agent, or Firm* — Burr & Brown

(57) ABSTRACT

There is provided a honeycomb structure comprising a plurality of honeycomb segments having porous partition walls separating and forming a plurality of cells and an outer peripheral wall located in the outermost periphery, first cells each open in an end portion on one side and plugged in the other end portion on the other side and second cells each plugged in the end portion on the one side and open in the other end portion on the other side being alternately disposed with the first cells having an area larger than that of the second cells in a cross section perpendicular to the central axial direction, and the outer peripheral wall having protruding portions along an external shape of the first cells and depressed portions along an external shape of the second cells. The honeycomb segments are bonded to each other with a bonding member.

4 Claims, 3 Drawing Sheets

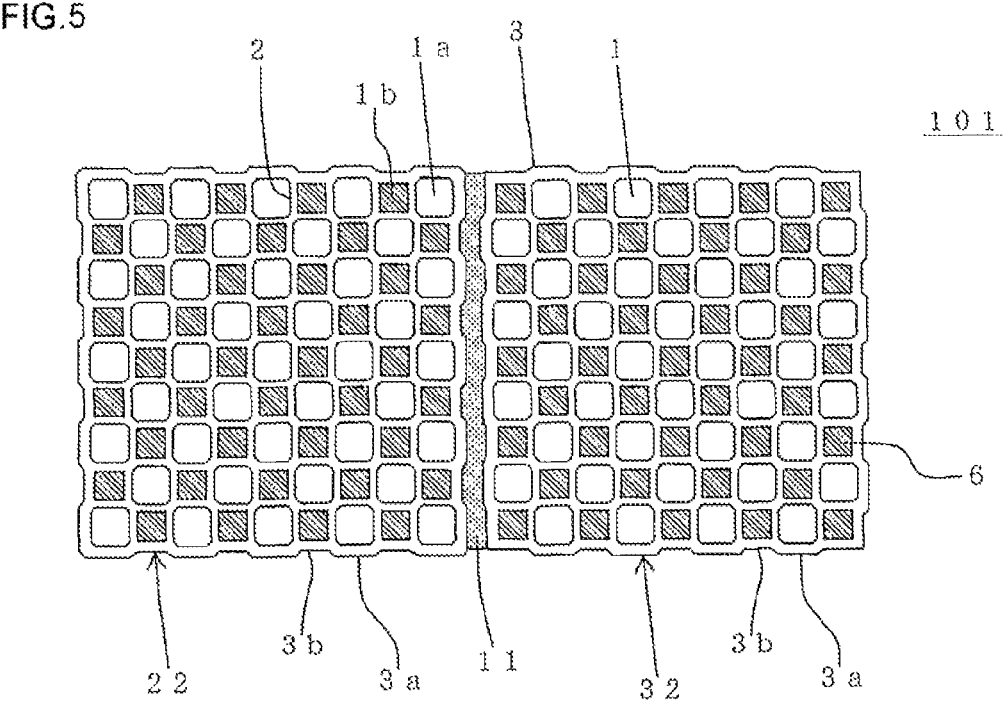

//HONEYCOMB STRUCTURE

CROSS REFERENCE TO RELATED APPLICATION

The present application is related to U.S. patent application Ser. No. 12/711,617 filed on Feb. 24, 2010.

FIELD OF THE INVENTION

The present invention relates to a honeycomb structure, more specifically, to a honeycomb structure capable of inhibiting separation of the honeycomb structure when combustion of trapped particulate matter (regeneration) is repeated and further capable of improving isostatic strength and suppressing the maximum temperature upon regeneration.

BACKGROUND OF THE INVENTION

A ceramic honeycomb structure excellent in thermal resistance and corrosion resistance is employed as a carrier for a catalytic device or a filter used for an environmental measure, collection of a specific material or the like in various fields such as chemistry, electric power, and iron and steel. In particular, recently, a honeycomb structure plugged alternately in cell open portions on both the end faces as a plugged honeycomb structure is frequently used as a diesel particulate filter (DPF) for trapping particulate matter (PM) discharged from a diesel engine or the like. As a material for the honeycomb structure used in a high temperature corrosive gas atmosphere, silicon carbide (Sic), cordierite, aluminum titanate (AT), and the like, which are excellent in thermal resistance and chemical stability, are suitably used.

Since silicon carbide has relatively large thermal expansion coefficient, a honeycomb structure formed with silicon carbide as the framework may cause a defect due to thermal shock upon use if the size is large. In addition, a defect may be caused due to thermal shock upon combusting and removing trapped particulate matter. Therefore, in the case of manufacturing a honeycomb structure using silicon carbide as the framework and having a predetermined or larger size, generally, a plurality of small plugged honeycomb structured segments are manufactured, and then they are bonded together to obtain one large bonded article. The outer periphery of the bonded article is subjected to coarse machining and grinding to obtain a plugged honeycomb structure having a desired shape such as a cylindrical shape (see, e.g., JP-A-2003-291054). The bonding of the segments is performed by the use of a bonding material, which is applied on a side face (outer peripheral wall) of a predetermined segment, and a plurality of segments are bonded together at the side faces to obtain a honeycomb structure where a plurality of segments are bonded by means of the bonding member.

Such a honeycomb structure formed by bonding honeycomb segments with a bonding material (bonding member) at side faces thereof has a problem of detachment of a honeycomb segment from the bonding member due to repeated heating and cooling when combustion of trapped particulate matter (regeneration) is repeated to sometimes cause separation of the honeycomb structure.

SUMMARY OF THE INVENTION

The present invention has been made in view of the aforementioned problems and aims to provide a honeycomb structure capable of inhibiting separation of the honeycomb structure when combustion of trapped particulate matter (regeneration) is repeated and further capable of improving isostatic strength and suppressing the maximum temperature upon regeneration.

In order to solve the above problems, the present invention provides the following honeycomb structures.

[1] A honeycomb structure comprising a plurality of honeycomb segments having porous partition walls separating and forming a plurality of cells functioning as fluid passages and an outer peripheral wall located in the outermost periphery and being thicker than the partition walls, the cells including first cells each open in an end portion on one side and plugged in the other end portion on the other side and second cells plugged in the end portion on the one side and open in the other end portion on the other side, the first cells and the second cells being alternately disposed with the first cells having an area larger than that of the second cells in a cross section perpendicular to the central axial direction; wherein the outer peripheral wall has protruding portions along an external shape of the first cells and depressed portions along an external shape of the second cells, and the honeycomb segments are disposed with side faces thereof facing each other and bonded to each other with a bonding member.

[2] The honeycomb structure according to [1], wherein the thickness of the outer peripheral wall is at most twice the thickness of the partition wall.

[3] The honeycomb structure according to [1] or [2], wherein the thickness of the outer peripheral wall along the external shape of the first cell is different from the thickness of the outer peripheral wall along the external shape of the second cell.

According to a honeycomb structure of the present invention, since the outer peripheral wall of each honeycomb segment has protruding portions along the external shape of the first cells and depressed portions along the external shape of the second cells, the contact area between the outer peripheral wall of the honeycomb segment and the bonding member in contact with the honeycomb segment is large, thereby increasing bonding strength between the honeycomb segment and the bonding member. This can inhibit detachment of the honeycomb segment from the bonding member even if tensile stress and compression stress are alternately applied to the honeycomb segment and the bonding member due to repeated regeneration and can inhibit separation of the honeycomb structure. In addition, since the outer peripheral wall of each honeycomb segment is thick, isostatic strength is improved, and thermal capacity of the honeycomb structure is improved to suppress the maximum temperature upon regeneration. As a result, the regeneration limit value is improved.

BRIEF DESCRIPTION OF THE DRAWINGS

FIG. 5 is a plan view schematically showing apart of one end face of another embodiment of a honeycomb structure of the present invention.

REFERENCE NUMERALS

1: cell, 1a: first cell, 1b: second cell, 2: partition wall, 2a: slanted partition wall, 3: outer peripheral wall, 3a: protruding portion, 3b: depressed portion, 3c: outer peripheral slanted partition wall, 4, 22, 32: honeycomb segment, 5: side face, 6: plugging portion, 11: bonding member, 12: outer peripheral portion, 21: honeycomb formed article, 100, 101: honeycomb structure, A: region (region including four honeycomb segments), H: height of protruding portion, D1: distance between protruding portions, D2: distance between depressed portions, W1: width of the first cell, W2: width of the second cell, t1: thickness of partition wall, t2: thickness of slanted partition wall, T1: partition wall thickness of protruding portion, T2: partition wall thickness of depressed portion, T3: thickness of outer peripheral slanted partition wall

DETAILED DESCRIPTION OF THE INVENTION

Next, embodiments of the present invention will be described in detail with referring to drawings. However, the present invention is by no means limited to the following embodiments, and it should be understood that changes, improvements, and the like of the design can appropriately be made on the basis of general knowledge of a person of ordinary skill in the art within the rage of not deviating from the gist of the present invention.

Figure 1:
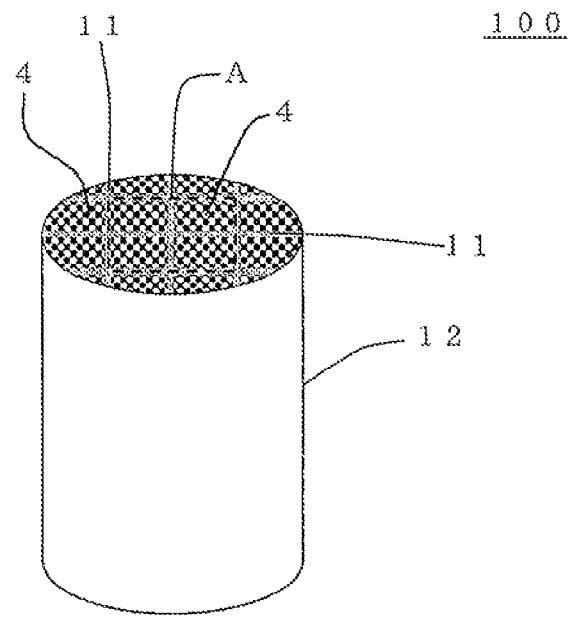
FIG. 1 is a perspective view schematically showing an embodiment of a honeycomb structure of the present invention.
Figure 2:
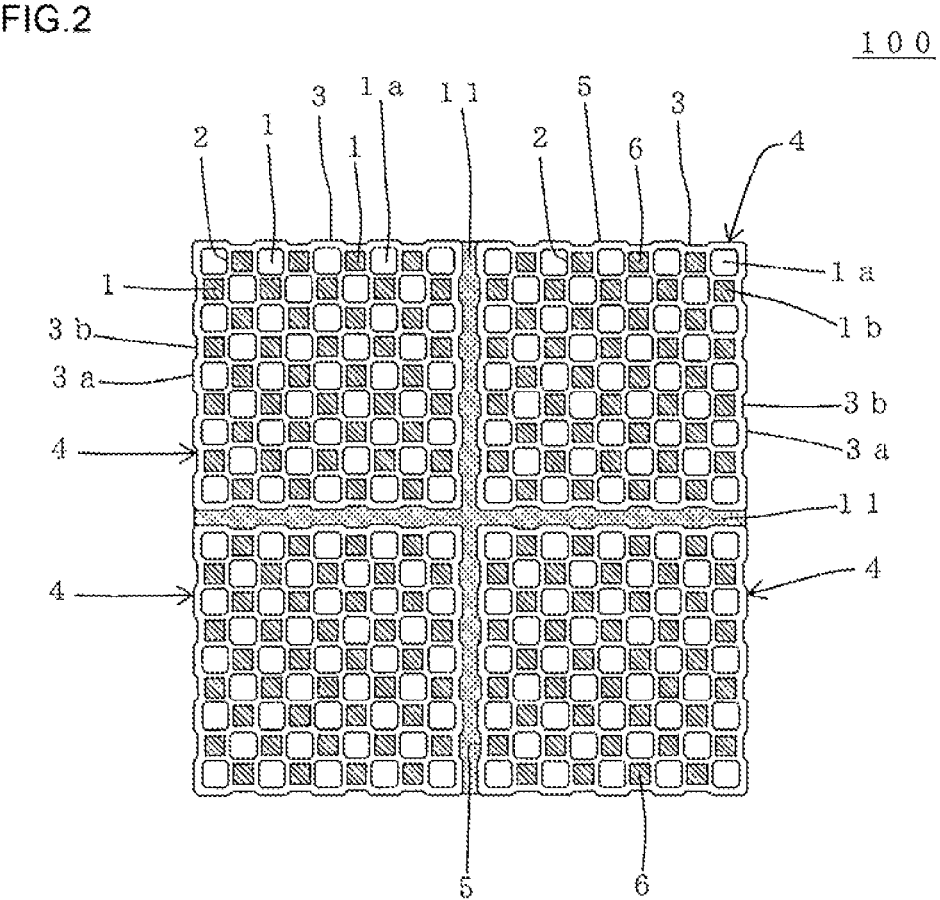
FIG. 2 is an enlarged plan view schematically showing the region A of FIG. 1.
Figure 3:
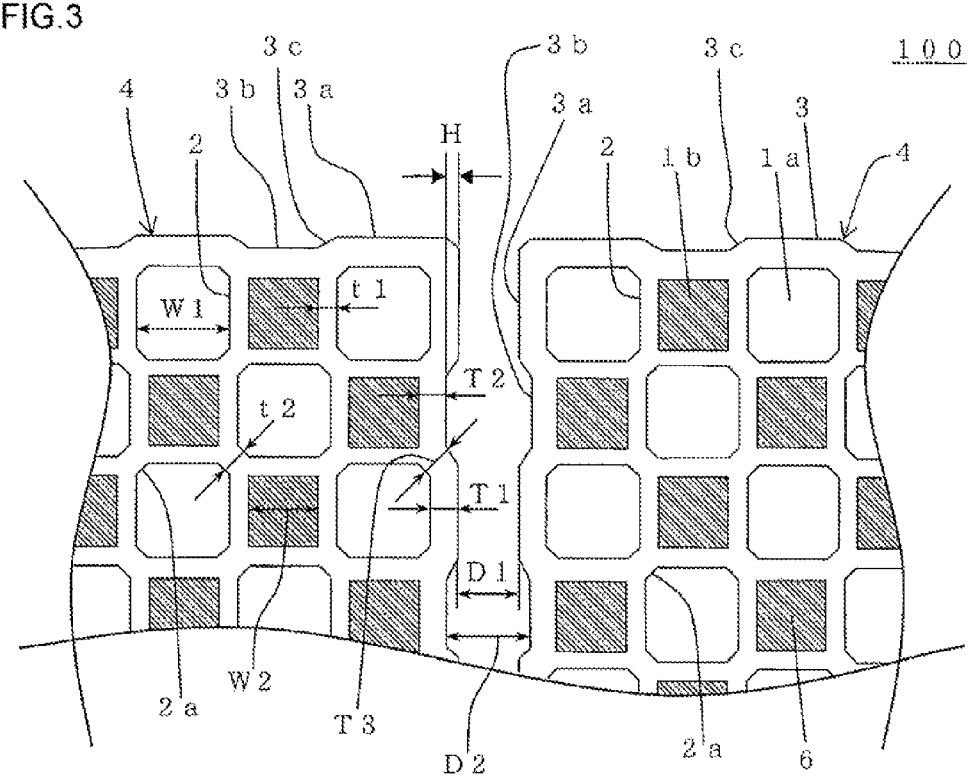
FIG. 3 is an enlarged plan view schematically showing a part on one end face side of an embodiment of a honeycomb structure of the present invention.

As shown in FIGS. 1 to 3, one embodiment of a honeycomb structure of the present invention is provided with a plurality of honeycomb segments 4 "having porous partition walls 2 separating and forming a plurality of cells 1 functioning as fluid passages and outer peripheral walls 3 located in the outermost periphery and being thicker than the partition walls, the cells including first cells 1a each open in an end portion on one side and plugged in the other end portion on the other side (plugging portion is formed on the end portion on the other side) and second cells 1b plugged in the end portion on the one side (plugging portion 6 is formed on the end portion on the one side) and open in the other end portion on the other side, the first cells 1a and the second cells 1b being alternately disposed with the first cells 1a having an area larger than that of the second cells 1b in a cross section perpendicular to the central axial direction (cell extension direction), the outer peripheral walls having protruding portions along an external shape of the first cells 1a and depressed portions along an external shape of the second cells 1b", and the honeycomb segments 4 being disposed with side faces 5 thereof facing each other and bonded to each other with a bonding member 11. The outer peripheral walls 3 are disposed to surround the entire partition walls 2. FIG. 1 is a perspective view schematically showing an embodiment of a honeycomb structure of the present invention. FIG. 2 is an enlarged plan view schematically showing the region A of FIG. 1. FIG. 2 is a plan view showing one end face side of four adjacent honeycomb segments among the honeycomb segments constituting the honeycomb structure 100 of the present embodiment. The one end face side of the honeycomb segments is the one end portion side of each cell. FIG. 3 is a plan view schematically showing an enlarged part on one end face side of an embodiment of a honeycomb structure of the present invention. In FIG. 3, the bonding member is omitted.

Thus, since a portion along the external shape of the first cell of the outer peripheral wall of each honeycomb segment is formed in a protruding shape, and a portion along the external shape of the second cell of the outer peripheral wall of each honeycomb segment is formed in a depressed shape to increase the contact area between the outer peripheral wall of the honeycomb segment and the bonding member in contact with the outer peripheral wall, bonding strength between the honeycomb segment and the bonding member is increased. Therefore, even when tensile stress and compression stress are alternately applied on the honeycomb segment and the bonding member due to repeated regeneration, detachment of the honeycomb segment from the bonding member can be inhibited, and separation of the honeycomb structure is inhibited. In the case that the side faces of the honeycomb segments are flat, it is necessary to make the area of the first cells each having a large area and being located in the outermost periphery decrease in accordance with the shape of the flat outer peripheral walls of the honeycomb segments. However, in a honeycomb structure of the present invention, since the outer peripheral wall forming the first cell located on the outermost side among the first cells is formed to have protruding portions along the external shape of the first cells, it is not necessary to decrease the area of the first cells having a large area and being located in the outermost periphery, and more particulate matter contained in exhaust gas can be trapped. In addition, since the outer peripheral wall of each honeycomb segment is thicker than the partition walls, isostatic strength is improved. Further, since the outer peripheral wall of each honeycomb segment is thicker than the partition walls, thermal capacity of the honeycomb structure increases in comparison with the case where the thickness of the outer peripheral walls is the same as that of the partition walls, thereby suppressing the maximum temperature upon regeneration, and, as a result, the regeneration limit value is improved.

In the honeycomb structure 100 of the present embodiment, the outer peripheral walls 3 are thicker than the partition walls 2. The thickness of the outer peripheral walls 3 is preferably at most 2 times, more preferably 1.5 to 2 times the thickness of the partition walls 2. When the thickness of the outer peripheral walls 3 is above 2 times the thickness of the partition walls 2, pressure loss may increase when exhaust gas or the like is allowed to flow into the honeycomb structure 100.

Here, "the outer peripheral walls 3 are thicker than partition walls 2" means that all of the partition wall thickness T1 of the protruding portion 3a (see FIG. 3), partition wall thickness T2 of the depressed portion 3b (see FIG. 3), and thickness T3 of the outer peripheral slanted partition wall (see FIG. 3) are larger than the partition wall thickness t1. In addition, "the thickness of the outer peripheral walls 3 is at most 2 times the thickness of the partition walls 2" means that all of the partition wall thickness T1 of the protruding portion 3a, partition wall thickness T2 of the depressed portion 3b, and thickness T3 of the outer peripheral slanted partition wall are at most 2 times the partition wall thickness t1. As shown in FIG. 3, the "outer peripheral slanted partition wall 3c" means a partition wall extending in the slanted direction with respect to the direction where the first cells and the second cells are alternately aligned in a cross section perpendicular to the central axis of the honeycomb structure 100. In other words, it is a partition wall connecting the partition wall of the protruding portion 3a with the partition wall of the depressed portion 3b on a slant (slantwise with respect to the direction where the partition wall of the protruding portion 3a and the partition wall of the depressed portion 3b extend) among the outer peripheral walls 3. Incidentally, in the outer peripheral walls 3 of an uneven shape, the protruding portion 3a and the depressed portion 3b do not include the outer peripheral slanted partition wall 3c.

In addition, it is preferable that the thickness of the outer peripheral wall (protruding portion 3a) along the external shape of the first cell (partition wall thickness T1 of the protruding portion 3a) is different from the thickness of the outer peripheral wall (depressed portion 3b) along the external shape of the second cell (partition wall thickness T2 of the depressed portion 3b). Since the partition thickness T1 of the protruding portion 3a may be different from the partition wall thickness T2 of the depressed portion 3b, the height H (see FIG. 3) of the protruding portion 3a of the outer peripheral wall 3 based on the depressed portion 3b of the outer peripheral wall 3 can be designed arbitrarily. The partition wall thickness t1 of the protruding portion 3a is preferably 0.2 to 1.5 mm. In addition, the partition wall thickness T2 of the depressed portion 3b is preferably 0.2 to 1.5 mm. The thickness T3 of the outer peripheral slanted partition walls is preferably 0.2 to 1.5 mm.

In the honeycomb structure 100 of the present embodiment, the height H (see FIG. 3) of the protruding portions 3a of the outer peripheral wall 3 based on the depressed portions 3b of the outer peripheral wall 3 is preferably 0.1 to 1.0 mm. Such a range of the height H of the protruding portions 3a enables to increase the bonding strength between the honeycomb segment and the bonding member. When the height H of the protruding portions 3a is smaller than 0.1 mm, the effect in increasing the bonding strength between the honeycomb segment and the bonding member may decrease. When the height H of the protruding portions 3a is larger than 1.0 mm, since attention has to be paid to deformation or the like of the honeycomb segment upon forming and firing, productivity may be deteriorated.

In the honeycomb structure 100 of the present embodiment, the distance (distance between two depressed portions 3b and 3b) D2 from the depressed portion (depressed portion 3b) of one outer peripheral wall to the depressed portion (depressed portion 3b) of the other peripheral wall is preferably 0.3 to 3.0 mm. When D2 is below 0.3 mm, productivity may be deteriorated because control of the thickness of the bonding material is hard upon assembling the honeycomb segments. When D2 is above 3.0 mm, productivity may be deteriorated because control of the thickness of the bonding material is hard upon assembling the honeycomb segments, and pressure loss may tend to increase. The "distance D2 from the depressed portion of an outer peripheral wall on one side to the depressed portion of the outer peripheral wall on the other side" is length of a perpendicular line from the depressed portion of the outer peripheral wall on the one side to the depressed portion of the outer peripheral wall on the other side. Therefore, even in the case that the depressed portion of the outer peripheral wall on the one side does not face the depressed portion of the outer peripheral wall on the other side with having a slippage, the distance D2 means length of the perpendicular line drawn from the depressed portion of the outer peripheral wall on the other side to an extension line of depressed portion of the outer peripheral wall on the one side.

In addition, in the honeycomb structure 100 of the present embodiment, in a pair of the outer peripheral walls 3 and 3 facing each other of adjacent honeycomb segments 4, the distance D1 between the protruding portions 3a and 3a is preferably 0.1 to 1.0 mm, more preferably 0.3 to 0.8 mm. When the distance D1 between the protruding portions 3a and 3a is below 0.1 mm, the bonding member deforms due to stress upon regeneration to cause collision of the outer peripheral walls with each other. When it is above 1.0 mm, pressure loss upon passing exhaust gas through the honeycomb structure may increase. The "distance between the protruding portions 3a and 3a" is length of the perpendicular line from the protruding portion of the outer peripheral wall on one side to the protruding portion of the other outer peripheral wall on the other side. In addition, the distance D2 between the depressed portions 3b and 3b (distance between the depressed portion 3b and the other depressed portion 3b) is shown by a value obtained by adding twice the height H to D1.

In the honeycomb structure 100 of the present embodiment, as shown in FIG. 2, in adjacent honeycomb segments 4, the protruding portions face each other, and the depressed portions face each other. Thus, it is preferable that the protruding portions face each other and that the depressed portions face each other in adjacent honeycomb segments 4 in a honeycomb structure of the present invention. However, as the honeycomb structure 101 shown in FIG. 5, it is also a preferable embodiment that a protruding portion 3a of a honeycomb segment faces a depressed portion 3b of the adjacent honeycomb segment 22 and 32. FIG. 5 is a plan view schematically showing a part of one end face of another embodiment of a honeycomb structure of the present invention.

A material for constituting the honeycomb structure of the present embodiment is preferably ceramic, more preferably at least one kind selected from the group consisting of silicon carbide, a silicon-silicon carbide based composite material, cordierite, mullite, alumina, spinel, a silicon carbide-cordierite based composite material, lithium aluminum silicate, aluminum titanate, and an iron-chrome-aluminum based alloy because of excellent strength and thermal resistance. Of these, silicon carbide or a silicon-silicon carbide based composite material is particularly preferable. Since silicon carbide has relatively large thermal expansion coefficient, a honeycomb structure formed with silicon carbide as the framework may cause a defect due to thermal shock upon use if the size is large. However, in a honeycomb structure of the present invention, since a plurality of honeycomb segments are disposed adjacently in such a manner that side faces thereof face each other and are bonded together with a bonding member, stress due to thermal expansion of silicon carbide is relaxed by the bonding member, and generation of a defect in the honeycomb structure can be inhibited.

The honeycomb segment (partition walls constituting the honeycomb segment) constituting a honeycomb structure of the present embodiment is preferably porous. The porosity of the honeycomb segment is 30 to 80%, preferably 40 to 65%. The porosity in such a range enables to decrease pressure loss with maintaining strength. When the porosity is below 30%, pressure loss may increase. When the porosity is above 80%, the strength and the thermal conductivity may be lowered. The porosity is a value obtained by measurement using a mercury porosimeter.

The honeycomb segment constituting a honeycomb structure of the present embodiment has a mean pore size of preferably 5 to 50 µm, more preferably 7 to 35 µm. The mean pore size in such a range enables to effectively trap particulate matter (PM). When the mean pore size is below 5 µm, clogging may be caused due to the particulate matter (PM). When the mean pore size is above 50 µm, particulate matter (PM) may pass through the filter without being trapped. The mean pore diameter is a value obtained by measurement using a mercury porosimeter.

In the case that the material for the honeycomb segment constituting the honeycomb structure of the present embodiment is silicon carbide, it is preferable that the silicon carbide particles have a mean particle size of 5 to 100 µm. The mean particle size in such a range has an advantage of easy control of the porosity and the pore size to be suitable for the filter. When the mean particle size is smaller than 5 μm, the pore size becomes too small. When it is larger than 100 μm, porosity becomes too high. When the pore size is too small, clogging is easily caused by the particulate matter (PM). When the porosity is too high, pressure loss may increase. The mean particle size of the raw material is a value measured according to JIS R 1629.

There is no particular limitation on a cell shape (cell shape in a cross section perpendicular to the central axial direction (cell extension direction) of a honeycomb structure) of the honeycomb segment constituting a honeycomb structure of the present embodiment, and there may be employed, for example, a triangle, a quadrangle, a hexagon, an octagon, a circle, or a combination thereof for each of the first cells and the second cells. Of these, as shown in FIGS. 2 and 3, it is preferable that the first cell 1a having a larger cross-sectional area is octagonal and that the second cell 1b having a smaller cross-sectional area is quadrangular. In addition, it is also preferable that the first cell has a quadrangular shape with the corner portions having a round R shape and that the second cell has a quadrangular shape.

In addition, in the honeycomb structure 100 of the present embodiment, in a cross section perpendicular to the central axis, the width W1 of the first cell (see FIG. 3) is preferably 0.8 to 3 mm. In addition, the width W2 of the second cell (see FIG. 3) is preferably 0.7 to 2.8 mm.

In addition, the thickness t1 of the partition wall (partition wall thickness) located between the first cells and the second cells (see FIG. 3) is preferably not larger than the thickness t2 of the slanted partition wall 2a, more preferably smaller than t2. As shown in FIG. 3, the "slanted partition wall 2a" means a partition wall extending in the slanted direction with respect to the direction where the first cells and the second cells are alternately aligned in a cross section perpendicular to the central axis of the honeycomb structure 100 and partition wall located on the extension of a diagonal line and extending in the direction of the diagonal line. In the honeycomb structure shown in FIG. 3, the slanted partition wall 2a is extended in the direction with an angle of inclination of 45° with respect to the direction where the first cells and the second cells are aligned. The partition wall thickness t1 is preferably 0.075 to 1.5 mm. In addition, the thickness t2 of the slanted partition walls 2a is preferably 0.09 to 2 mm. In addition, the thickness T3 of the outer peripheral slanted partition walls 3c is preferably at least the thickness t2 of the slanted partition walls 2a, more preferably above the thickness t2.

In addition, though there is no particular limitation on the cell density of the honeycomb segment, it is preferably 0.9 to 311 cells/cm$^2$, more preferably 7.8 to 62 cells/cm$^2$.

In the honeycomb structure of the present embodiment, the cross sectional area of the first cell is larger than that of the second cell. Here, the "cross sectional area of the first cell" or the "cross sectional area of the second cell" means the "area in a cross section perpendicular to the central axial direction (cell extension direction) of a honeycomb structure" in each cell. In addition, by allowing exhaust gas to flow in from the open end portion side of the first cells (one end portion side), to pass through the partition wall, and to be discharged from the open end portion side (the other end portion side) of the second cells, particulate matter in the exhaust gas can be trapped on the surface of the partition walls having a large surface area inside the first cells. Therefore, clogging of the cells on the inflow side due to particulate matter can be inhibited. In the honeycomb segment constituting the honeycomb structure of the present embodiment, the cross-sectional area of the first cells is preferably 120 to 300%, more preferably 140 to 250% with respect to the cross-sectional area of the second cells. When the cross-sectional area of the first cell is smaller than 120% of the cross-sectional area of the second cell, the effect in inhibiting clogging of the inflow side cells (first cells) may be deteriorated. When the cross-sectional area of the first cell is larger than 300% of the cross-sectional area of the second cell, pressure loss may increase because the cross sectional-area of the outflow side cells (second cells) is small.

In addition, in a cross section perpendicular to the central axial direction of the honeycomb structure of the present embodiment, the number of the honeycomb segments disposed is preferably 4 to 144, more preferably 16 to 100. As the size of the honeycomb segment, the cross-sectional area perpendicular to the central axis is preferably 3 to 16 cm$^2$, more preferably 7 to 13 cm$^2$. When it is smaller than 3 cm$^2$, pressure loss when gas passes through the honeycomb structure may increase. When it is larger than 16 cm$^2$, the effect in inhibiting fracture of the honeycomb segment may be deteriorated.

As shown in FIGS. 1 and 2, the honeycomb structure of the present embodiment has plugging portions in end portions on one side of the second cells 1b and in the end portions on the other side of the first cells 1a of the honeycomb segment 4, and the first cells and the second cells are alternately disposed in such a manner that the end faces of the honeycomb segment 4 show a checkerwise pattern.

The bonding member 11 constituting the honeycomb structure of the present embodiment is disposed between adjacent honeycomb segments, and the honeycomb segments are bonded together by means of the bonding member 11. The bonding member 11 is prefer ably disposed over the whole side faces facing each other of the adjacent honeycomb segments. The material for the bonding member 11 is preferably a material obtained by, for example, kneading a mixture obtained by adding additives such as organic binder, a resin balloon, and a dispersant to an inorganic raw material such as inorganic fibers, colloidal silica, kneaded clay, SiC particles and further adding water to the mixture.

As shown in FIG. 1, it is preferable that the honeycomb structure of the present embodiment is provided with the outer peripheral portion 12 formed so as to surround the whole honeycomb segments 4. The provision of the outer peripheral portion 12 exhibits effects such as improved roundness of the honeycomb structure. The thickness of the outer peripheral portion 12 of the honeycomb structure of the present embodiment is preferably 0.1 to 4.0 mm, more preferably 0.3 to 1.0 mm. When it is below 0.1 mm, a crack may easily be caused upon peripheral coating. When it is above 4.0, pressure loss may increase. The "thickness of the outer peripheral portion" means the distance from the outer peripheral face of the outer peripheral portion to the nearest cell.

There is no particular limitation on the whole shape of the honeycomb structure of the present embodiment, and a desired shape such as a circular cylindrical shape or an oval shape may be employed. In addition, as the size of the honeycomb structure, in the case of a circular cylindrical shape, the bottom face has a diameter of preferably 50 to 450 mm, more preferably 100 to 350 mm. In addition, a length in the central axial direction of the honeycomb structure is preferably 50 to 450 mm, and more preferably 100 to 350 mm.

Next, a method for manufacturing an embodiment of a honeycomb structure of the present invention will be described.

(1) Manufacturing of Honeycomb Segment:

In the first place, to a ceramic raw material are added a binder, a surfactant, a pore former, water, and the like to obtain a forming raw material. The ceramic raw material is preferably at least one kind selected from the group consisting of silicon carbide, a silicon-silicon carbide based composite material, cordierite, mullite, alumina, spinel, a silicon carbide-cordierite based composite material, lithium aluminum silicate, aluminum titanate, and an iron-chrome-aluminum alloy. Of these, silicon carbide and a silicon-silicon carbide based composite material are preferable. In the case of using a silicon-silicon carbide based composite material, a mixture of a silicon carbide powder and a metal silicon powder is used as the ceramic raw material. The ceramic raw material content is preferably 30 to 90 mass % with respect to the whole forming raw material.

As the binder, there can be employed methyl cellulose, hydroxypropoxyl cellulose, hydroxyethyl cellulose, carboxymethyl cellulose, polyvinyl alcohol, or the like. Of these, it is preferable to use methyl cellulose and hydroxypropoxyl cellulose together. The binder content is preferably 2 to 20 mass % with respect to the whole forming raw material.

The water content is preferably 5 to 50 mass % with respect to the whole forming raw material.

As the surfactant, ethylene glycol, dextrin, fatty acid soap, polyalcohol, or the like can be used. These may be used alone or in combination of two or more. The surfactant content is preferably 0 to 5 mass with respect to the whole forming raw material.

There is no particular limitation on the pore former as long as it forms pores after firing, and, for example, starch, a resin balloon, water-absorbing resin, silica gel, or the like may be employed. The pore former content is 0 to 20 mass % with respect to the whole forming raw material.

Next, the forming raw material is kneaded to form kneaded clay. There is no particular limitation on the method for forming kneaded clay by kneading the forming raw material, and, for example, a method using a kneader or a vacuum kneader can be employed.

Figure 4:
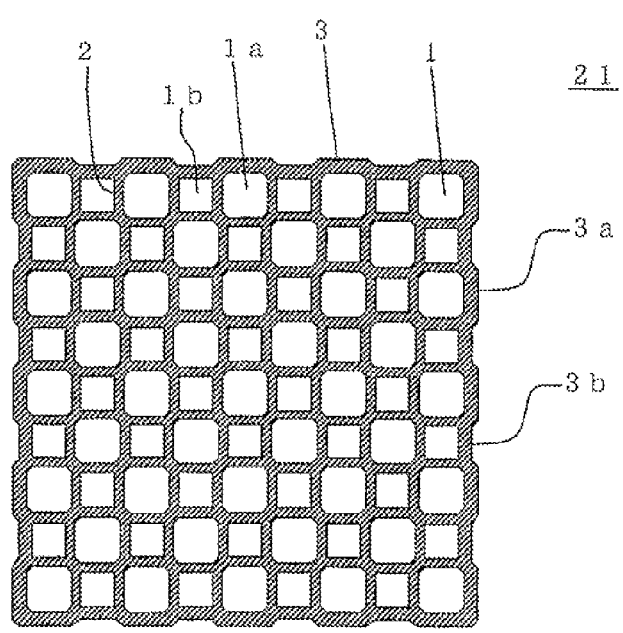
FIG. 4 is a schematic view showing a cross section perpendicular to a central axial direction of a cylindrical honeycomb formed article manufactured in the production process in a method for manufacturing an embodiment of a honeycomb structure of the present invention.

Next, the kneaded clay is subjected to extrusion forming to obtain a plurality of honeycomb formed articles 21 as shown in FIG. 4. Upon extrusion forming, there is preferably used a die having desired segment shape, disposition of the segment, cell shape, partition wall thickness, cell density, and the like. As the material for the die, a superhard alloy hardly abrading away can preferably be used. The honeycomb formed article 21 has the porous partition walls 2 separating and forming a plurality of cells 1 functioning as fluid passages and the outer peripheral walls 3 located in the outermost periphery. In a cross section perpendicular to the central axial direction, the first cells 1a each having a large area and the second cells 1b each having a small area are alternately disposed, and the outer peripheral wall 3 has protruding portions 3a along the external shape of the first cells 1a and depressed portions 3b along the external, shape of the second cells 1b. FIG. 4 is a schematic view showing a cross section perpendicular to a central axial direction of a cylindrical honeycomb formed article manufactured in the production process in a method for manufacturing an embodiment of a honeycomb structure of the present invention.

The partition wall thickness, cell density, thickness of outer peripheral portion, and the like of the honeycomb formed article 21 can appropriately be determined in accordance with the honeycomb structure of the present invention to be manufactured in consideration of shrinkage by drying and firing.

It is preferable that the obtained honeycomb formed article is dried before firing. There is no particular limitation on the method for drying, and there may be employed, for example, an electromagnetic wave heating method such as microwave heat-drying and high frequency dielectric heat-drying or an external heating method such as hot air drying and superheated steam drying. Of these, in that the whole formed article can be dried quickly and uniformly without causing a crack, it is preferable that, after drying a certain amount of water by an electromagnetic wave heating method, the remaining water is dried by an external heating method. As the drying conditions, it is preferable that, after removing water of 30 to 90 mass % with respect to the water content before drying by an electromagnetic wave heating method, water content is reduced to 3 mass % or less by an external heating method. A dielectric heat-drying is preferable in the case of an electromagnetic wave heating method, and hot air drying is preferable in the case of an external heating method.

Next, in the case that the honeycomb formed article 21 does not have desired length in the central axial direction, both the end portions are cut away to obtain the desired length. Though there is no particular limitation on the method for cutting, a method using a circular sawing machine or the like may be employed.

Next, it is preferable that the honeycomb formed article 21 is fired to obtain a honeycomb fired article. Before firing, in order to remove the binder or the like, calcination is preferably performed. The calcination is preferably performed at 400 to 500° C. for 0.5 to 20 hours in an ambient atmosphere. There is no particular limitation on the method for the calcination and firing, and the firing can be performed by the use of an electric furnace, a gas furnace, or the like. Preferable conditions are 1300 to 1500° C. for 1 to 20 hours in an inert atmosphere such as nitrogen, argon, or the like.

Next, plugging is preferably performed in the end portions on one side of the second cells having smaller area in a cross section perpendicular to the central axis and the end portions on the other side of the first cells having a larger area in a cross section perpendicular to the central axis of the honeycomb formed article (plugging portions are formed) to obtain a plugged honeycomb fired article. There is no particular limitation on the method for plugging, and, for example, the following method can be employed. After applying a sheet on one side end face of the honeycomb formed article, holes are made in positions corresponding with the cells (the second cells) to be plugged of the sheet. Then, the end face having the sheet applied thereon of the honeycomb fired article is immersed in plugging slurry obtained by slurrying the constituent material for plugging portions to fill the plugging slurry in the open end portions of the cells (second cells) to be plugged through the holes made in the sheet. Regarding the other side end face of the honeycomb fired article, plugging is performed (the plugging slurry is filled) in the cells (first cells) having no plugging on the one side end face in the same method as in the method for performing plugging on the aforementioned one side end face. As the constituent material for plugging portions, it is preferable to use the same material as that for the honeycomb formed article. It is preferable that firing is performed in the same conditions as the aforementioned firing conditions after the plugging portions are formed. The forming of the plugging portions may be performed before firing the honeycomb formed article.

(2) Manufacturing of Honeycomb Structure:

A predetermined number of honeycomb segments are bonded together with bonding member to form a honeycomb segment bonded article where the honeycomb segments are disposed in such a manner that the side faces face each other and that the side faces are bonded to each other with a bonding member. The honeycomb segment bonded article may be used as the honeycomb structure finally obtained. The bonding member is preferably disposed over the whole side faces facing each other. The bonding member plays a role of buffering (absorbing) the volume change upon thermal expansion or thermal shrinkage of the honeycomb segments and a role of bonding the honeycomb segments.

There is no particular limitation on the method for applying the bonding material on the side faces of the honeycomb segments, and there may be employed a brush application method or the like.

AS the bonding material, there may be used slurry or the like obtained by adding additives such as an organic binder, a resin balloon, and a dispersant to an inorganic raw material such as inorganic fibers, colloidal silica, clay, SiC particles, and further adding water, followed by kneading.

After the honeycomb segment bonded article is formed, it is possible that the outer peripheral portion is ground to obtain a desired shape. After the honeycomb segment bonded article is formed, or after further grinding the outer peripheral portion to obtain a desired shape, it is preferable to perform an outer peripheral coat treatment to dispose the outer peripheral portion in the outermost periphery of a honeycomb segment bonded article, thereby obtaining a honeycomb structure. For example, in the case of manufacturing the honeycomb structure shown in FIG. 1 (4×4 honeycomb segments), 16 quadrangular prism honeycomb segments are bonded together to obtain a honeycomb segment bonded article, the outer periphery of the honeycomb segment bonded article is ground to obtain a circular columnar honeycomb segment bonded article, and the outer peripheral portion is disposed to obtain a honeycomb structure. The outer peripheral coat treatment has an advantage of improving roundness of the honeycomb structure, and the like. As the outer peripheral coat treatment, there may be employed a method where an outer peripheral coat material is applied on the outermost periphery of the honeycomb segment bonded article, followed by drying. As the outer peripheral coat material, there may be used a mixture of inorganic fibers, colloidal silica, clay, SiC particles, an organic binder, a resin balloon, a dispersant, and water. There is no particular limitation on the method for applying the outer periphery coat material, and there may be employed a method where the material is coated by the use of a rubber spatula with rotating a honeycomb structure on a potter's wheel.

EXAMPLES

Hereinbelow, the present invention will be described more specifically with referring to Examples. However, the present invention is by no means limited to these Examples.

Example 1

As the ceramic raw material, a SiC powder and a metal Si powder were mixed at a mass ratio of 80:20, and to the mixture were added methyl cellulose and hydroxypropoxy methyl cellulose as forming auxiliaries, starch and water absorbing resin as pore formers, a surfactant, and water, followed by kneading with a vacuum kneader to obtain kneaded clay having a quadrangular prism shape.

The kneaded clay having a quadrangular prism shape obtained above was formed, by the use of an extrusion-forming machine, into a honeycomb formed article having a structure having porous partition walls 2 separating and forming a plurality of cells 1 and the outer peripheral walls 3 located in the outermost periphery thereof, the first cells 1a having a large area and the second cells 1b having a small area in a cross section perpendicular to the central axial direction being alternately disposed, the outer peripheral walls 3 each having protruding portions 3a and depressed portions 3b alternately aligned. The honeycomb formed article was subjected to high frequency dielectric heat-drying and the subsequent drying at 120° C. for 2 hours by the use of a hot air drier, followed by cutting both the end faces at a predetermined amount.

The honeycomb formed article was dried at 120° C. for five hours by the use of a hot air drier, degreased at about 450° C. for five hours by the use of an atmospheric furnace with a deodorizer in an ambient atmosphere, and then fired at about 1450° C. for five hours in an Ar inert atmosphere to obtain a plugged porous honeycomb fired article where SiC crystal particles were bonded with Si. The honeycomb fired article had a mean pore size of 13 μm and a porosity of 41%. The mean pore size and the porosity were measured by a mercury porosimeter.

For the honeycomb fired article obtained above, plugging portions were formed in an end portion on one side of each of the second cells and the end port ion on the other side of each of the first cells. As the filler for the plugging, the same material as for the honeycomb formed article was used. After the plugging portions were formed in the honeycomb fired article, the honeycomb fired article was fired under the same conditions as the aforementioned firing conditions to form a honeycomb segment. The honeycomb segment had a bottom face having an external shape size of 37.06 mm×37.06 mm (measured at the outer peripheral protruding portions) and a length of 155 mm in the central axial direction. In addition, the width W1 of the first cells was 1.24 mm, and the width W2 of the second cells was 0.92 mm. The partition wall thickness t1 was 0.38 mm, the partition wall thickness T1 of the protruding portions was 0.39 mm, the partition wall thickness T2 of the depressed portions was 0.39 mm, and the thickness T3 of the outer peripheral slanted partition wall was 0.39 mm.

The honeycomb segments obtained above were bonded with a bonding material to have a disposition of 4×4 as in the honeycomb structure shown in FIG. 1 to obtain a honeycomb segment bonded article. As the bonding material, there was used slurry containing a mixture of aluminosilicate inorganic fibers and SiC particles. As the bonding material, there was used slurry containing 30 mass % of water, 30 mass % of aluminosilicate, and 30 mass % of SiC particles with respect to the whole bonding material. The other components contained in the bonding material were an organic binder, a resin balloon, and a dispersant.

The outer peripheral coat treatment was performed on the honeycomb segment bonded article obtained above to dispose the outer peripheral portion in the outermost periphery of the honeycomb segment bonded article. Thus, a honeycomb structure was obtained. As the outer peripheral coat material, there was used a material obtained by adding additives such as an organic binder, a resin balloon, and a dispersant to an inorganic raw material such as inorganic fibers, colloidal silica, clay, and SiC particles to obtain a mixture and kneading the mixture.

In the honeycomb structure obtained above, the height H (height H of protruding portion based on the depressed portion) of the outer peripheral wall was 0.16 mm. In addition, the "sum of height of the two protruding portions in adjacent honeycomb segments" was 0.32 mm. In addition, the "distance D1 between protruding portions" between two adjacent honeycomb segments was 0.3 mm, and the distance D2 between the depressed portions was 0.62 mm.

The honeycomb structure obtained above was evaluated for "isostatic strength", "hot vibration test", "regeneration limit", and "pressure loss" by the following methods. The results are shown in Table 1. In Table 1, regarding Examples 1 to 10 and Comparative Examples 2 and 3, the "isostatic strength", "regeneration limit", and "pressure loss" show increase or decrease with respect to Comparative Example 1 with employing the results of the Comparative Example 1 as the standards, and, regarding Examples 11 to 16 and Comparative Example 5, "isostatic strength", "regeneration limit", and "pressure loss" show increase or decrease with respect to Comparative Example 4 with employing the results of the Comparative Example 4 as the standards.

(Isostatic Strength)

Isostatic strength was measured according to the method for measuring isostatic fracture strength prescribed in JASO standard M505-87, which is an automotive standard issued by Society of Automotive Engineers of Japan.

(Hot Vibration Test)

With an inlet gas temperature of 900° C., a vibration acceleration of 50 G, a vibration frequency of 200 Hz, heated exhaust gas was allowed to flow into an exhaust gas purification apparatus, and vibrations due to exhaust gas were applied in an axial direction of the honeycomb structure. The evaluations were given as "excellent" in the case that the moving amount (displacement) of the "honeycomb structure" after 300 hours is below 0.2 mm, "good" in the case of 0.2 to 0.4 mm, and "fair" in the case of 0.4 to 0.6 mm (excluding 0.4 mm). The displacement of the abutting faces after 300 hours is 0.6 mm or less is not a problem for practical use, it is preferably 0.4 mm or less.

(Regeneration Limit Value)

Using the honeycomb structure as a DPF, the soot deposition amount was gradually increased to perform regeneration (soot combustion) and confirm the limit where a crack generated. In the first place, a ceramic non-intumescent mat was wrapped around the outer periphery of the honeycomb structure obtained above as the holding material, and they were put in a can made of SUS409 to obtain a canning structure. Then, combustion gas containing soot generated by combustion of a diesel fuel (light oil) was allowed to flow into the honeycomb structure from an end face on the side where the first cells 1 are open and discharged from the other end face of the honeycomb structure, thereby depositing the soot inside the honeycomb structure. After the honeycomb structure was cooled down to room temperature, combustion gas containing oxygen at a predetermined rate at 680° C. was allowed to flow into the honeycomb structure, and the combustion gas flow rate was reduced when the pressure loss of the honeycomb structure was lowered, thereby rapidly combusting soot. Then, the presence/absence of crack generation in the plugged honeycomb structure was confirmed. This test was started when the soot deposition amount was 4 g per 1 liter (hereinbelow referred to as 4 g/liter or the like) of the capacity of the honeycomb structure, and the soot deposition amount was increased by 0.5 (g/liter) until crack generation was confirmed, which was repeated. The regeneration limit was obtained from the measurement results (average value of measurement of 5 (N=5) honeycomb structures in each Example) of the regeneration limit value (soot amount when the initial crack generated) (g/liter) in the honeycomb structures in each Example.

(Pressure Loss)

Pressure loss of a honeycomb structure was measured by the use of a "pressure loss measurement apparatus for a filter" described in JP-A-2005-172652. As the measurement conditions, the fluid flow rate was 10 $Nm^3$/min., and the fluid temperature in the experiment was 25° C.

TABLE 1

| | W1 (mm) | W2 (mm) | H (mm) | D1 (mm) | D2 (mm) | t1 (mm) | T1 (mm) | T2 (mm) | Isostatic strength | Hot vibration test | Regeneration limit (g/liter) | Pressure loss (%) |
|---|---|---|---|---|---|---|---|---|---|---|---|---|
| Example 1 | 1.24 | 0.92 | 0.160 | 0.3 | 0.62 | 0.38 | 0.39 | 0.39 | +3 | Excellent | +0.1 | 0 |
| Example 2 | 1.24 | 0.92 | 0.160 | 0.3 | 0.62 | 0.38 | 0.58 | 0.58 | +6 | Excellent | +0.3 | +1 |
| Example 3 | 1.24 | 0.92 | 0.160 | 0.5 | 0.82 | 0.38 | 0.76 | 0.76 | +9 | Excellent | +0.6 | +3 |
| Example 4 | 1.24 | 0.92 | 0.160 | 0.3 | 0.62 | 0.38 | 0.85 | 0.85 | +12 | Excellent | +0.8 | +4 |
| Example 5 | 1.24 | 0.92 | 0.350 | 0.3 | 1.00 | 0.38 | 0.58 | 0.39 | +3 | Excellent | +0.2 | 0 |
| Example 6 | 1.24 | 0.92 | 0.340 | 0.8 | 1.48 | 0.38 | 0.76 | 0.58 | +6 | Excellent | +0.5 | +2 |
| Example 7 | 1.24 | 0.92 | 0.250 | 0.5 | 1.00 | 0.38 | 0.85 | 0.76 | +9 | Excellent | +0.7 | +3 |
| Example 8 | 1.24 | 0.92 | 0.100 | 0.4 | 0.60 | 0.38 | 0.39 | 0.45 | +3 | Excellent | +0.2 | 0 |
| Example 9 | 1.24 | 0.92 | 0.100 | 0.4 | 0.60 | 0.38 | 0.58 | 0.64 | +6 | Excellent | +0.4 | +2 |
| Example 10 | 1.24 | 0.92 | 0.100 | 0.4 | 0.60 | 0.38 | 0.76 | 0.82 | +9 | Excellent | +0.7 | +3 |
| Example 11 | 1.26 | 0.95 | 0.155 | 0.3 | 0.61 | 0.25 | 0.26 | 0.26 | +3 | Excellent | +0.1 | 0 |
| Example 12 | 1.26 | 0.95 | 0.155 | 0.3 | 0.61 | 0.25 | 0.50 | 0.50 | +8 | Excellent | +0.4 | +1 |
| Example 13 | 1.26 | 0.95 | 0.155 | 0.3 | 0.61 | 0.25 | 0.62 | 0.62 | +11 | Excellent | +0.6 | +3 |
| Example 14 | 1.26 | 0.95 | 0.265 | 0.5 | 1.03 | 0.25 | 0.41 | 0.30 | +4 | Excellent | +0.3 | +1 |
| Example 15 | 1.26 | 0.95 | 0.245 | 0.3 | 0.79 | 0.25 | 0.50 | 0.41 | +6 | Excellent | +0.4 | +1 |
| Example 16 | 1.26 | 0.95 | 0.105 | 0.6 | 0.81 | 0.25 | 0.27 | 0.32 | +3 | Excellent | +0.2 | 0 |
| Comp. Ex. 1 | 1.24 | 0.92 | 0.160 | 0.3 | 0.62 | 0.38 | 0.38 | 0.38 | — | Excellent | — | — |
| Comp. Ex. 2 | 1.24 | 0.92 | 1.000 | 2.2 | 4.20 | 0.38 | 1.22 | 0.38 | 0 | Excellent | +0.4 | +6 |
| Comp. Ex. 3 | 1.24 | 0.92 | 0.090 | 1.2 | 1.38 | 0.38 | 0.38 | 0.45 | 0 | Good | +0.1 | +4 |
| Comp. Ex. 4 | 1.26 | 0.95 | 0.105 | 0.3 | 0.51 | 0.25 | 0.20 | 0.25 | — | Excellent | — | — |
| Comp. Ex. 5 | 1.26 | 0.95 | 1.305 | 0.3 | 2.91 | 0.25 | 1.40 | 0.25 | 0 | Excellent | +0.2 | +4 |

EXAMPLES 2 TO 16 AND COMPARATIVE EXAMPLES 1 TO 5

Honeycomb structures were manufactured in the same manner as in Example 1 except that the width W1 of the first cells, width W2 of the second cells, partition wall thickness t1, partition wall thickness T1 of the protruding portions, partition wall thickness T2 of the depressed portions, height H of the protruding portions of the outer peripheral wall, distance D1 between protruding portions, and distance D2 between depressed portions were changed as shown in Table 1 and that T3 was the same as the larger one between T1 and T2. The evaluations for "isostatic strength", "hot vibration test", "regeneration limit", and "pressure loss" were given in the same manner as in Example 1. The results are shown in Table 1. Incidentally, the number of cells was selected in such a manner that each of the honeycomb segments had a bottom face having an external shape size of about 37 mm×37 mm (measured at protruding portions).

From Table 1, it can be understood that the honeycomb structures of Examples 1 to 16 showed good results of evaluations for isostatic strength, hot vibration test, regeneration limit, and pressure loss. In particular, good results were shown in the evaluations for the isostatic strength. In contrast, in honeycomb structures of Comparative Examples 1 to 5, it can be understood that the isostatic strength was low since the thickness (T1, T2, and T3) of the outer peripheral walls was not larger than the thickness (t1) of the partition wall. In addition, from Example 1 and the like and Comparative Example 1, it can be understood that the regeneration limit value improves by making T1 and T2 larger than t1.

A method for manufacturing a honeycomb structure of the present invention can suitably be used as a carrier for a catalytic device or a filter used for an environmental measure, collection of a specific material or the like in various fields such as chemistry, electric power, and iron and steel.

What is claimed is:

1. A honeycomb structure comprising a plurality of honeycomb segments having porous partition walls separating and forming a plurality of cells functioning as fluid passages and an outer peripheral wall located in the outermost periphery and being thicker than the partition walls, the cells including first cells each open in an end portion on one side and plugged in the other end portion on the other side and second cells plugged in the end portion on the one side and open in the other end portion on the other side, the first cells and the second cells being alternately disposed with the first cells having an area larger than that of the second cells in a cross section perpendicular to the central axial direction;

wherein the outer peripheral wall has protruding portions along an external shape of the first cells and depressed portions along an external shape of the second cells, a height of the protruding portions of the outer peripheral wall, relative to a height of the depressed portions, is between 0.1 to 1.0 mm, and the honeycomb segments are disposed with side faces thereof facing each other and bonded to each other with a bonding member, and wherein in a pair of outer peripheral walls of adjacent honeycomb segments facing each other, a distance between the protruding portions is 0.1 to 1.0 mm.

2. The honeycomb structure according to claim 1, wherein the thickness of the outer peripheral wall is at most twice the thickness of the partition wall.

3. The honeycomb structure according to claim 1, wherein the thickness of the outer peripheral wall along the external shape of the first cell is different from the thickness of the outer peripheral wall along the external shape of the second cell.

4. The honeycomb structure according to claim 2, wherein the thickness of the outer peripheral wall along the external shape of the first cell is different from the thickness of the outer peripheral wall along the external shape of the second cell.

* * * * *